United States Patent [19]

Stanford et al.

[11] 4,098,716
[45] Jul. 4, 1978

[54] CATALYST FOR SULFITE SCAVENGERS

[75] Inventors: James R. Stanford, Sugar Land; John H. Martin, Fresno; George D. Chappell, Rosenberg, all of Tex.

[73] Assignee: Nalco Chemical Company, Oak Brook, Ill.

[21] Appl. No.: 701,842

[22] Filed: Jul. 1, 1976

Related U.S. Application Data

[62] Division of Ser. No. 683,974, May 6, 1976, Pat. No. 3,996,135.

[51] Int. Cl.² ............................................. C09K 3/00
[52] U.S. Cl. ............................. 252/188; 252/187 R; 252/187 H

[58] Field of Search ............... 252/188, 187 R, 187 H

[56] References Cited

U.S. PATENT DOCUMENTS

| 3,580,851 | 5/1971 | Heid et al. | 252/187 R |
| 3,823,225 | 7/1974 | Sprague | 252/187 R |

*Primary Examiner*—Stephen J. Lechert, Jr.
*Attorney, Agent, or Firm*—John G. Premo; Robert A. Miller; Barry W. Sufrin

[57] ABSTRACT $ClO_2$ and its water-soluble salts are catalysts for water-soluble bisulfites when these latter compounds are used as oxygen scavengers in aqueous systems.

2 Claims, 7 Drawing Figures

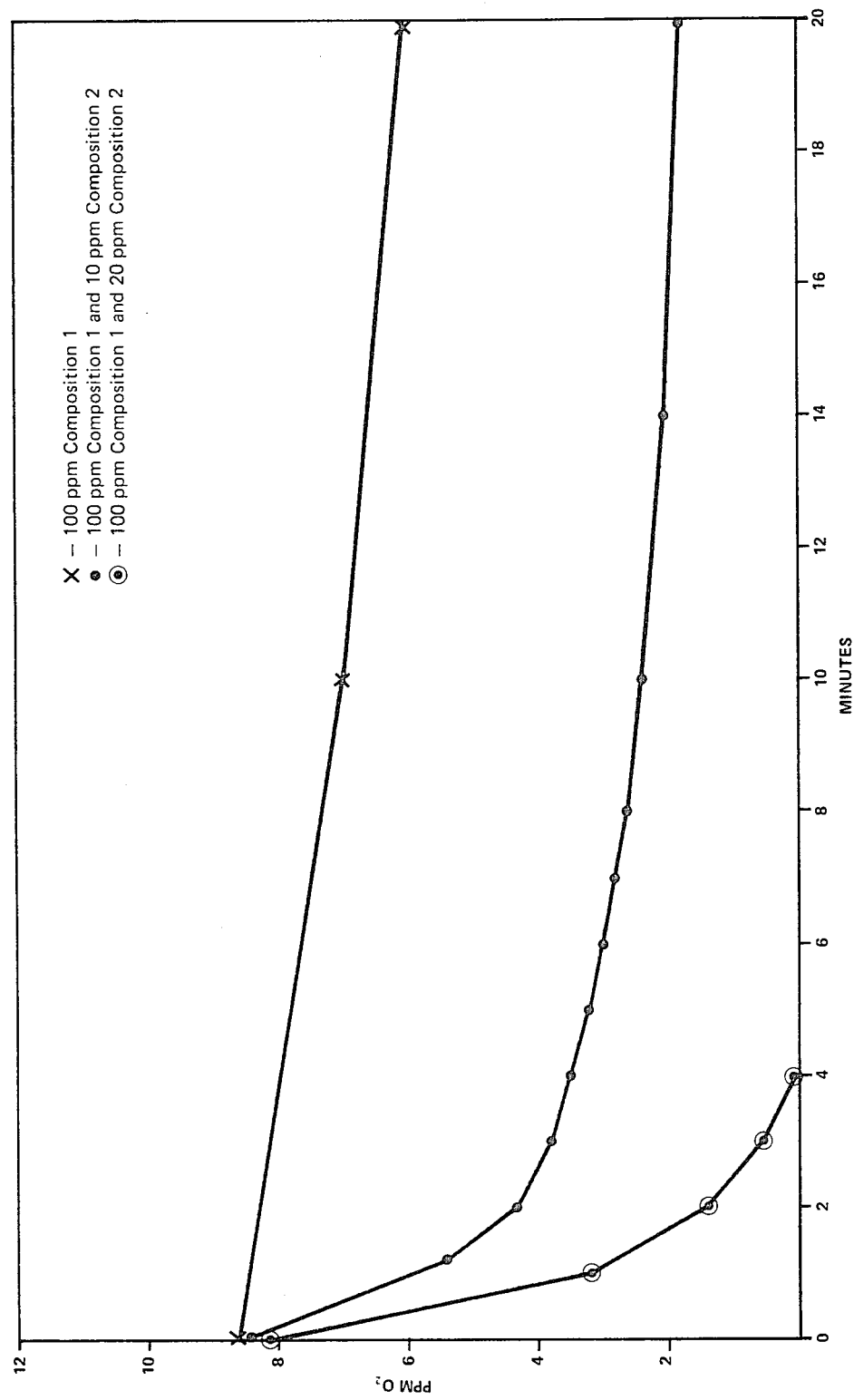

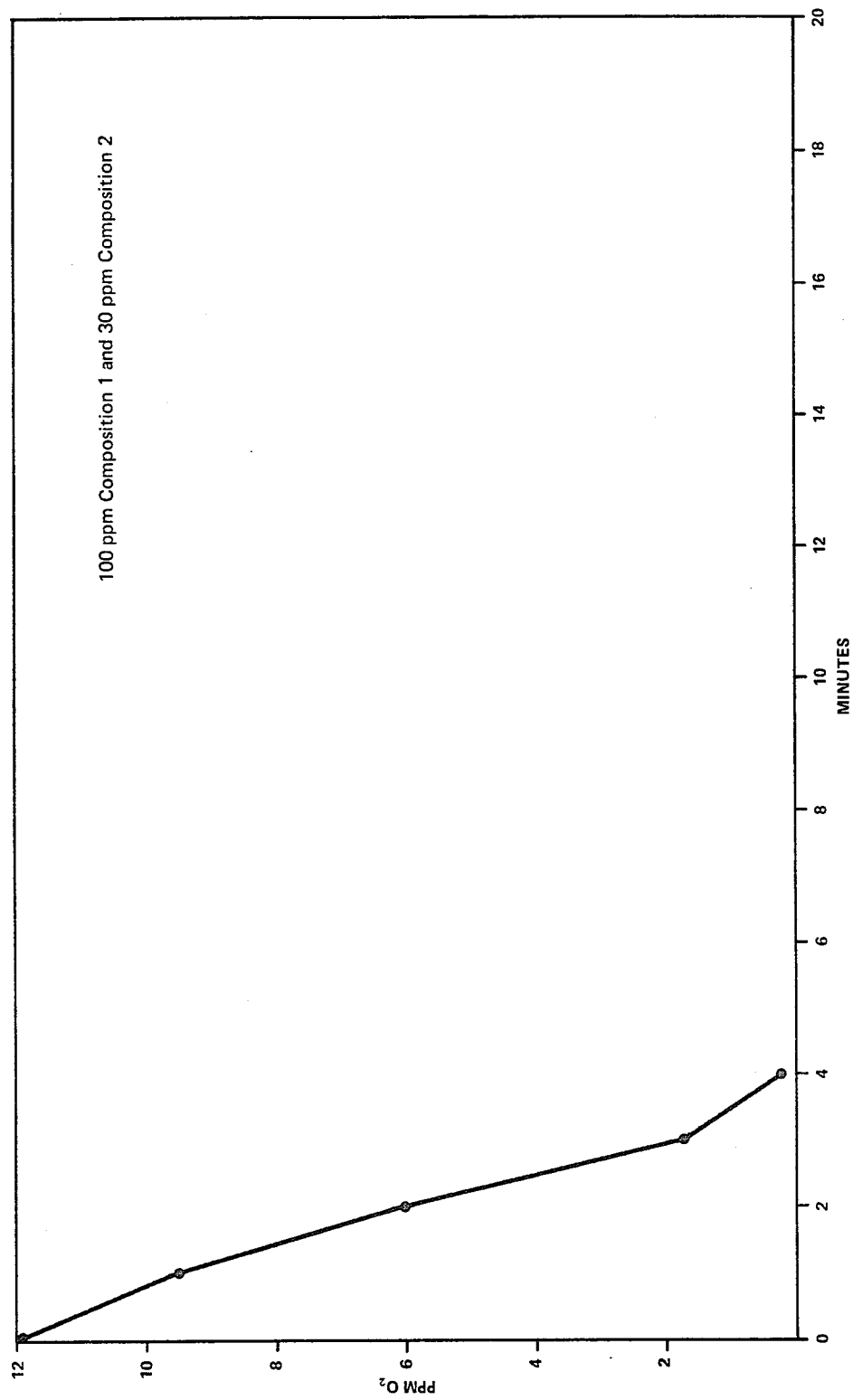

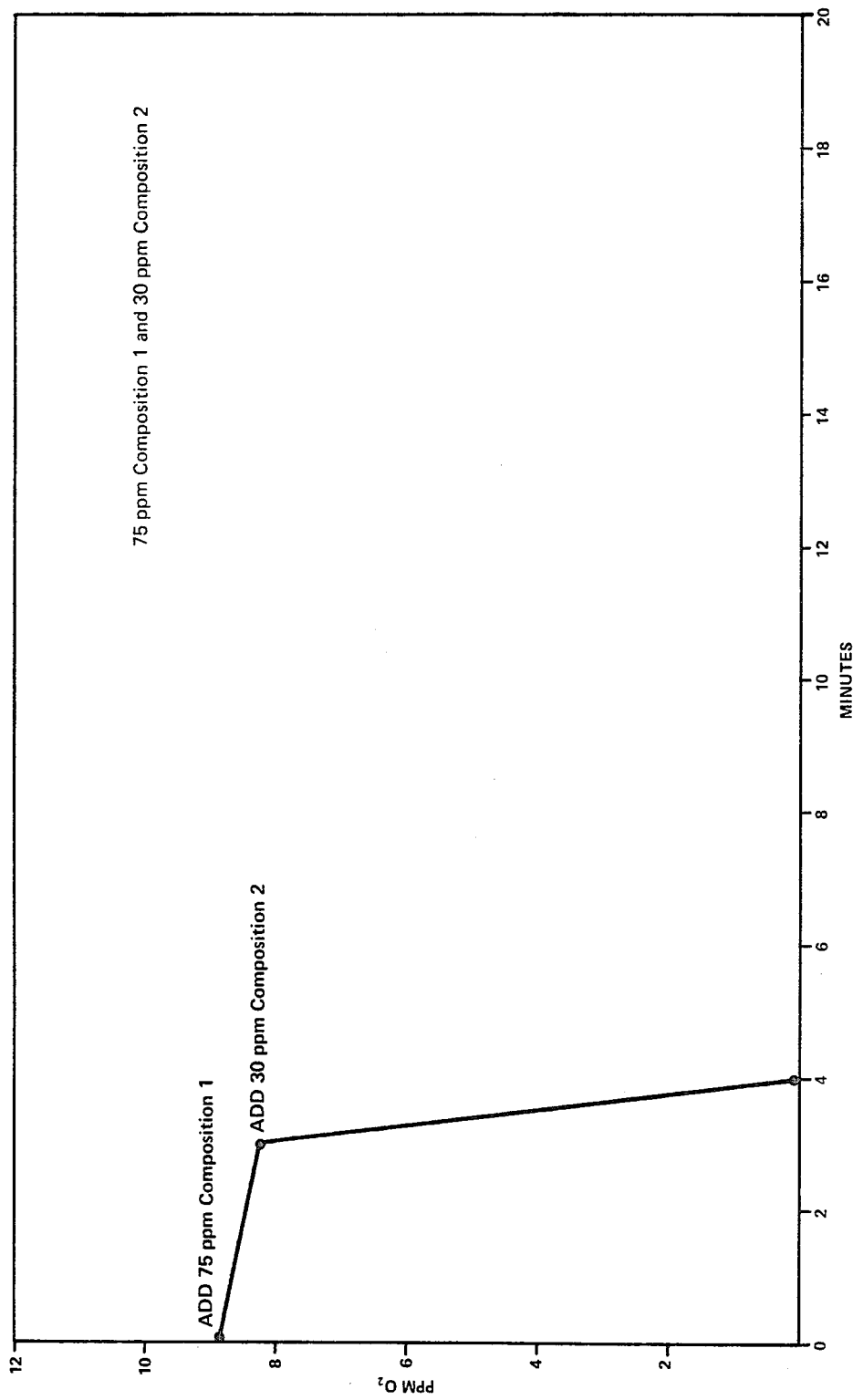

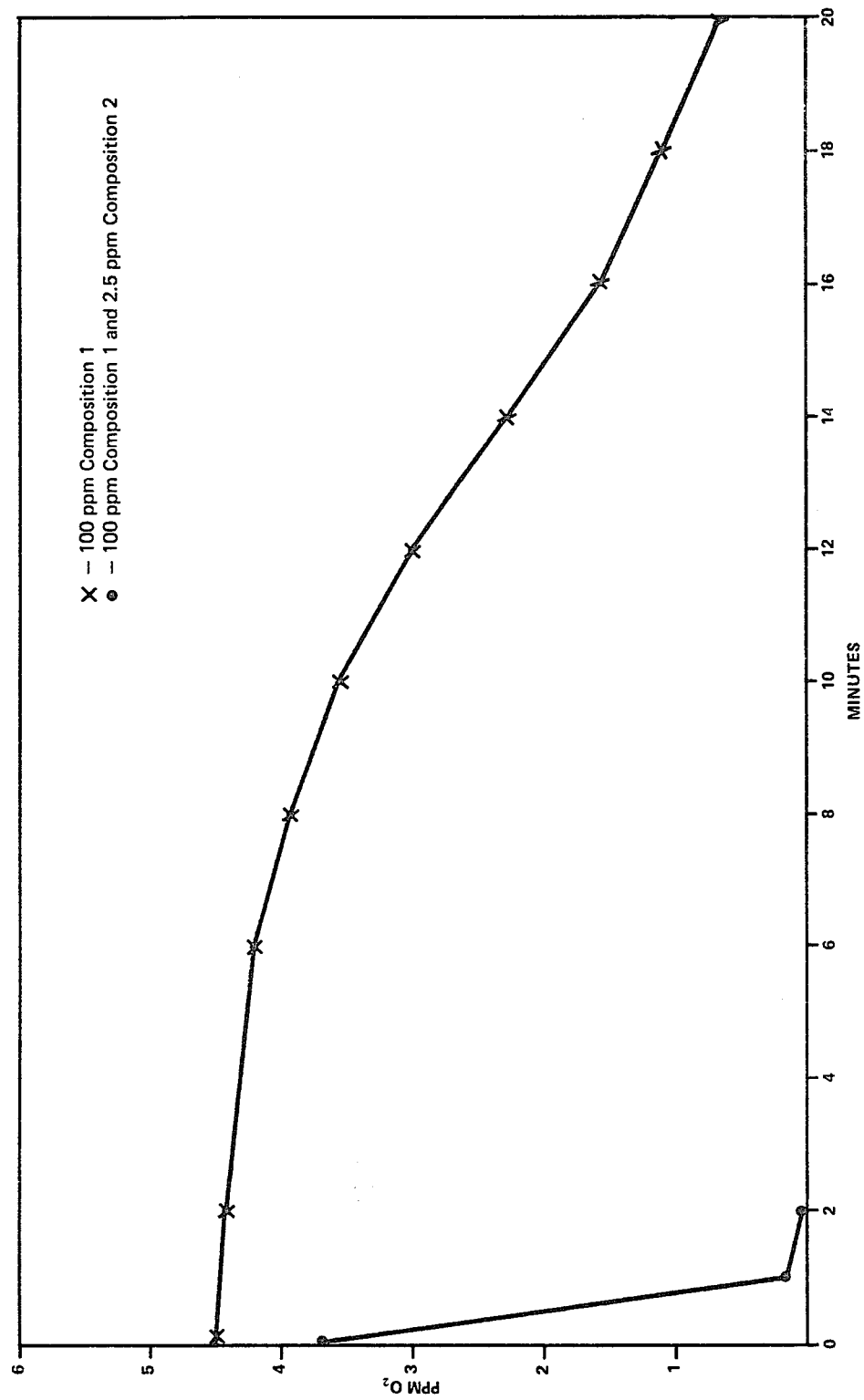

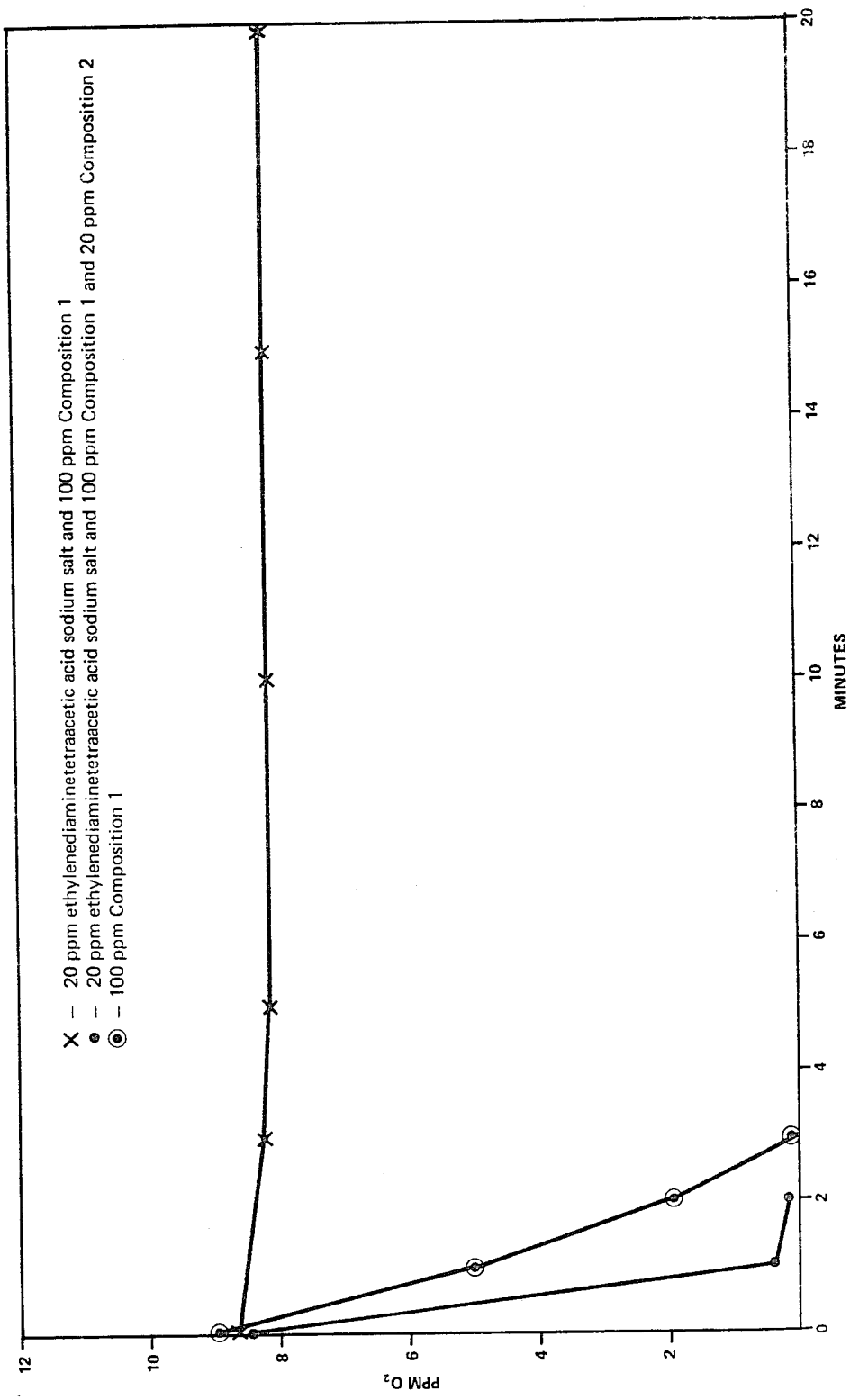

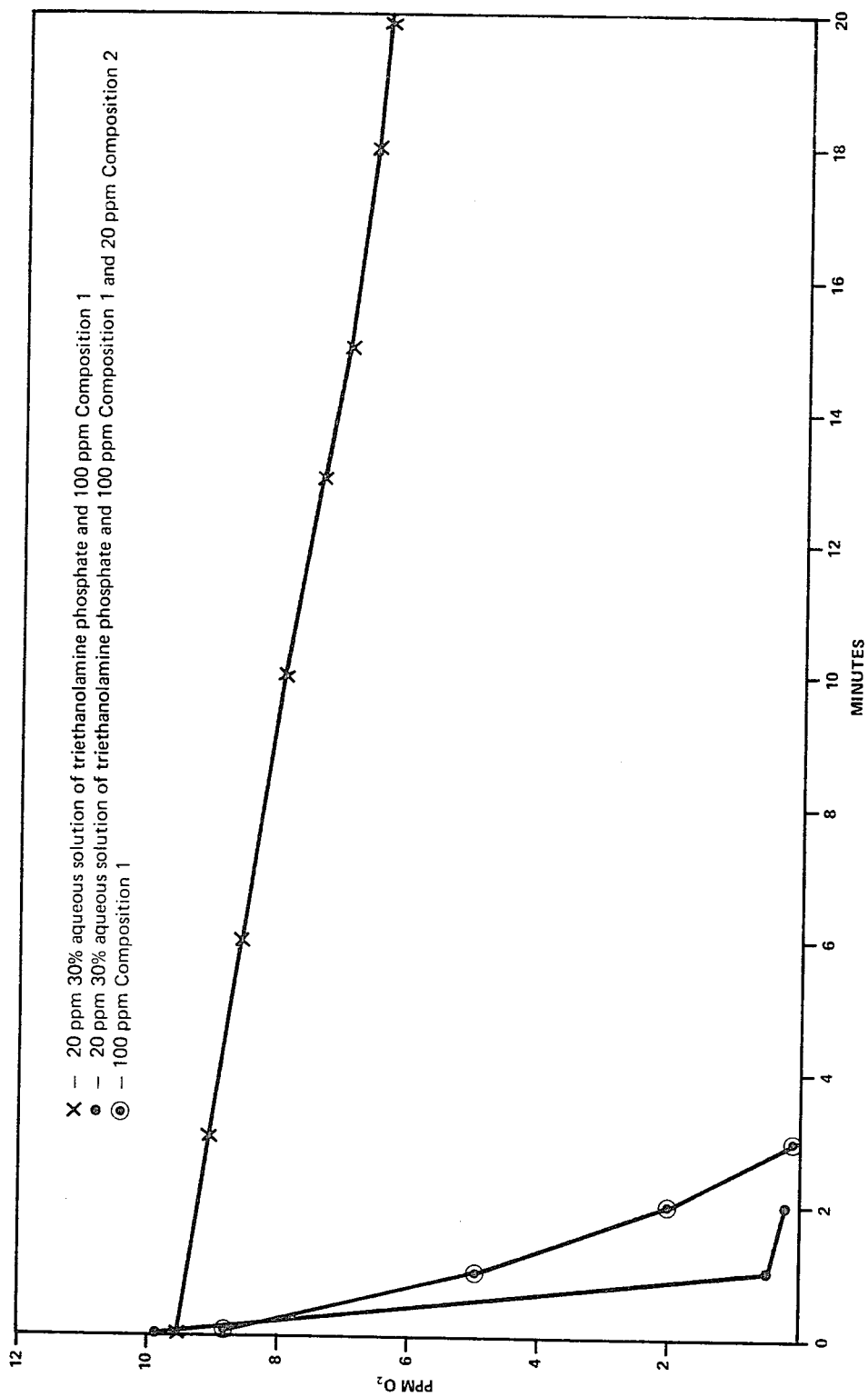
FIGURE VI

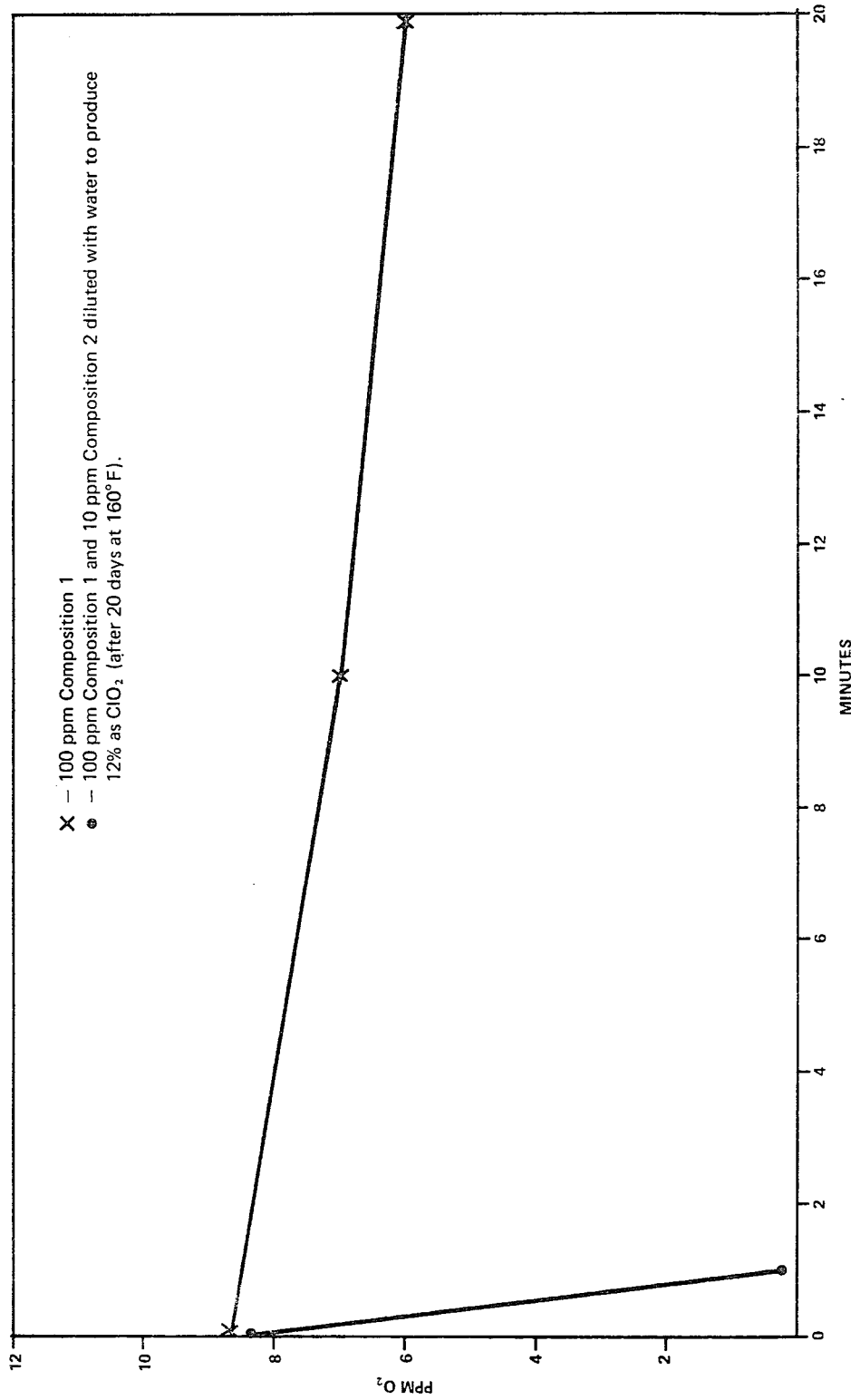
FIGURE VII
Composition 2 — stability (after 20 days at 160° F)
Sour tap water; Room Temp.; 5–10 ppm H$_2$S.
× — 100 ppm Composition 1
● — 100 ppm Composition 1 and 10 ppm Composition 2 diluted with water to produce 12% as ClO$_2$ (after 20 days at 160° F).

CATALYST FOR SULFITE SCAVENGERS

This is a divisional of application Ser. No. 683,974 filed on May 6, 1976, now U.S. Pat. No. 3,996,135.

INTRODUCTION

Many industrial waters are treated to remove or reduce the oxygen contained therein. Illustrative of such waters are boiler waters and injection waters used in the secondary recovery of petroleum. For many years, it has been customary to treat oxygencontaining waters to remove or reduce the dissolved oxygen with inorganic bisulfites such as sodium or ammonium bisulfite. The bisulfite reaction with oxygen in these industrial applications requires 8 parts by volume of the water-soluble bisulfite to be added per parts by volume of molecular oxygen contained in the fluid being treated.

The bisulfite reaction with oxygen is slow. It is customary to use in conjunction with bisulfite oxygen scavengers small amounts of a catalyst to increase the rate of reaction between the dissolved oxygen and the bisulfite.

One of the most commonly used catalysts for promoting the bisulfite oxygen reaction are various water-soluble cobaltcontaining compounds. Cobalt catalyzed bisulfites have been used for many years as oxygen scavengers for treating boiler waters. When cobalt is used as a catalyst with soluble bisulfites to treat boiler waters which contain chelating agents or scale suppressants or are used to treat injection waters which are contaminated with $H_2S$ and are used as a flooding medium in the secondary recovery of petroleum, their effectiveness is greatly diminished. In the case of boiler water treatments, scale and corrosion inhibitors frequently complex with cobalt, rendering it unavailable as a catalyst. In the case of secondary recovery operations, these waters are frequently contaminated with $H_2S$ which forms an insoluble precipitate with cobalt which, again, nullifies its catalytic activity with respect to the bisulfite oxygen reaction.

It is now known that even cobalt catalyzed bisulfite oxygen reactions are measurably slowed down when the oxygen-containing waters contain substantial amounts of dissolved solids such as are found in natural brines or when the temperature of such waters is reduced to about the freezing point.

It would be a valuable contribution to the art if there were afforded an improved catalyst for the bisulfite oxygen reaction when such reaction is used to scavenge oxygen from water. Such catalyst should be capable of operating at low dosages. Further, it should be inexpensive, be water-soluble, and be immune from the effects of the water temperature, dissolved solids, and would not be affected by the presence of chemical scale inhibitors, chelating agents or hydrogen sulfide.

THE INVENTION

In accordance with the invention, it has been found that water-soluble bisulfite oxygen scavengers can be improved in their operational efficiency when they are used in the presence of a catalytic amount of a compound comprising chlorine dioxide or its water-soluble salts. The water-soluble salts of chlorine dioxide include the alkali metal or ammonium chlorites.

The amount of chlorine dioxide or water-soluble chlorite used in the practice of the invention may vary over a fairly broad range. As a general rule, it is possible to use as little as 0.001% to 50% by weight based on the bisulfite compound used as the oxygen scavenger. In most cases, quantities ranging from 0.01 to 25% by weight give good results with amounts ranging between 1 - 10% by weight giving excellent results in most cases. One of the findings of the invention resides in the fact that as the amount of catalyst is increased, the rate of the reaction is also increased.

In most applications, the sodium chlorite in the form of an aqueous solution will be employed. It is understood, however, that chlorine dioxide can be used by bubbling it into the aqueous solution to be treated or it can be bled into a causticized solution to produce sodium chlorite. Alternatively, if it is desired to use $ClO_2$, it may be generated by acidizing aqueous solutions of alkali metal chlorites.

In boiler water applications, the mot commonly used watersoluble bisulfite scavenger is sodium bisulfite. The catalyst of the invention work extremely well with this material when it is used to scavenge oxygen from boiler waters.

In the case of the water flood applications, an extremely useful oxygen scavenger is ammonium bisulfite which is especially prepared for such applications. Illustrative of a typical ammonium bisulfite composition is an aqueous solution which contains between 60 - 65% of ammonium bisulfite. This material is prepared by adding anhydrous ammonia and sulfur dioxide to water while keeping the temperature below 75° C. A typical product of this type hereinafter listed as Composition 1:

Composition 1

| Material | Weight Percentage |
|---|---|
| Water | 23.80 |
| Anhydrous Ammonia | 36.42 |
| Sulfur Dioxide | 39.78 |
| | 100.00 |

As previously indicated, sodium chlorite is a preferred catalyst for utilization in the practice of this invention. From a commercial standpoint, it is desirable that this material be made available in the form of an aqueous concentrate to facilitate its shipping to a use site. When concentrated solutions of sodium chlorite are prepared, there is a tendency for such solutions to decompose under conditions of long-term storage. To overcome this deficiency, we have devised a stable aqueous solution of sodium chlorite which contains relatively large amounts of sodium chlorite, is relatively non-viscous, and has a good "shelf" or storage life. This composition is set forth below as Composition 2:

Composition 2

| Ingredients | Weight Percentage |
|---|---|
| Tap Water | 74.0 |
| Sodium Carbonate | 5.0 |
| Sodium Chloride | 5.0 |
| Sodium Chlorite | 16.0 |

In the above formula, the sodium chloride portion of the formula tends to act as a pour point depressant whereas the sodium carbonate acts as a stabilizer to prevent decomposition of the sodium chlorite.

A generic concentrate of the type shown in Composition 2 is set forth in Composition 2A below:

Composition 2A

| Ingredients | Weight Percentage Range |
|---|---|
| Tap Water | 37.0 – 74.0 |
| Sodium Carbonate | 2.5 – 5.0 |

Composition 2A-continued

| Ingredients | Weight Percentage Range |
| --- | --- |
| Sodium Chloride | 2.5 – 5.0 |
| Sodium Chlorite | 8.0 – 16.0 |

EXAMPLES

To illustrate the invention, a variety of tests were run to determine the effectiveness of the chlorite catalyzed scavengers under a variety of conditions:

BRIEF DESCRIPTION OF THE DRAWINGS

In the attached drawings,

FIG. I and FIG. II show test results indicating that Composition 2 is an effective catalyst for Composition 1.

FIG. III shows Composition 1 to be ineffective as an oxygen scavenger after three minutes in a tap water system. With the addition of Composition 2, it is shown that the oxygen is quickly scavenged.

FIG. IV shows the effectiveness of Composition 2 as a catalyst for Composition 1 in cold sea water.

FIGS. V and VI show the effectiveness of Composition 2 as a catalyst for Composition 1 in the presence of a chelating agent or scale inhibitor.

FIG. VII shows the stability of Composition 2 diluted with water to produce a solution containing 12% as $ClO_2$ and its continued effectiveness as a catalyst for Composition 1. FIGS. I thru VII are more fully described in Examples 1 thru 5 below.

EXAMPLE 1: Sour Lab Tap Water

Results using Sugar Land, Texas, tap water containing 5 – 10 ppm $H_2S$ are shown on FIGS. I and II. These test results show that Composition 2 is an effective catalyst for Composition 1.

EXAMPLE 2: Correlate Tap Water

Results using tap water from the correlate system are shown on FIG. III. This water contained only a trace amount of iron sulfide (<1 ppm) and had a pH of 7.9. This test shows Composition 1 to be ineffective after three minutes, but with the addition of Composition 2, the oxygen is quickly scavenged.

EXAMPLE 3: COLD SEA WATER

The effectiveness of Composition 2 as a catalyst for Composition 1 in cold sea water (32° F.) is shown on FIG. IV. The results shown that without any catalyst, Composition 1 scavenges the oxygen at a very slow rate, but with the addition of 2.5 ppm of Composition 2, the oxygen is removed in two minutes.

EXAMPLE 4: Tap Water with Chelant or Scale Inhibitor

Results showing the effect of a chelant, ethylenediamine tetraacetic acid or scale inhibitor (30% aqueous solution of triethanolamine phosphate on Composition 1 in tap water are shown on FIGS. V and VI. Composition 2 makes Composition 1 very effective in the presence of a chelant or scale inhibitor.

EXAMPLE 5: Stability

The stability of Composition 2 diluted with water to produce 12% as $ClO_2$ is shown on FIG. VII. The neat chemical was placed in a 160° F. bath for 20 days and then checked for effectiveness as a catalyst for Composition 1 in sour tap water. The results show that Composition 2 diluted with water to produce 12% as $ClO_2$ had no loss of effectiveness after this time.

Having thus described our invention, we claim:

1. A stable aqueous concentrate of sodium chlorite having the following composition:

| Ingredients | Weight Percentage |
| --- | --- |
| Tap Water | 74.0 |
| Sodium Carbonate | 5.0 |
| Sodium Chloride | 5.0 |
| Sodium Chlorite | 16.0 |

2. A stable aqueous concentrate of sodium chlorite having the following composition:

| Ingredients | Weight Percentage Range |
| --- | --- |
| Tap Water | 37.0 – 74.0 |
| Sodium Carbonate | 2.5 – 5.0 |
| Sodium Chloride | 2.5 – 5.0 |
| Sodium Chlorite | 8.0 – 16.0 |

* * * * *